United States Patent [19]

Trainer

[11] Patent Number: 5,553,669

[45] Date of Patent: Sep. 10, 1996

[54] PARTICULATE SEPARATOR FOR FLUID PRODUCTION WELLS

[76] Inventor: C. W. Trainer, 8090 E. Kalil, Scottsdale, Ariz. 85260

[21] Appl. No.: 389,124

[22] Filed: Feb. 14, 1995

[51] Int. Cl.[6] ................................................. E21B 43/00
[52] U.S. Cl. ......................................... 166/105.1; 166/231
[58] Field of Search ........................... 166/105.1, 105.2, 166/105.3, 236, 231, 232

[56] References Cited

U.S. PATENT DOCUMENTS

| | | | |
|---|---|---|---|
| 50,343 | 10/1865 | Maguire | 166/236 |
| 1,379,477 | 5/1921 | Perry | 166/105.1 |
| 1,507,927 | 9/1924 | Miller | 166/236 X |
| 4,476,925 | 10/1984 | Cox | 166/105.1 |
| 5,295,537 | 3/1994 | Trainer | 166/105.3 X |

*Primary Examiner*—David J. Bagnell
*Attorney, Agent, or Firm*—Richard R. Mybeck; Peter B. Scull

[57] ABSTRACT

An improved particulate separator is made from a strainer mandrel disposed in a velocity tube. The velocity tube and strainer mandrel are hollow and tubularly shaped and positioned concentrically such that a small radial distance is left open between the interior of the velocity tube and the exterior of the strainer mandrel to create an annular, vertical fluid flow region. The velocity tube and the strainer mandrel are attached to each other at their respective top ends by a solid plug means that prohibits fluid flow into or out of the top end of the annular fluid flow region. The bottom end of the strainer mandrel is plugged while the bottom end of the annular fluid flow region is left open to create the main fluid flow inlet to the particulate separator. The preferred velocity tube is a unitary hollow cylinder with a substantially solid wall while the strainer mandrel is preferably a helical tension spring.

18 Claims, 1 Drawing Sheet

PARTICULATE SEPARATOR FOR FLUID PRODUCTION WELLS

The present invention relates generally to equipment for use in a fluid production well, and more particularly involves a device for separating particulate matter such as sand and like granules from the fluids extracted from the well. The description which follows discloses the invention in association with an oil well. This is done for exemplary purposes only, there being no intention to so limit the use of the invention.

BACKGROUND OF THE INVENTION

In pumping fluids from a well, certain difficulties may arise depending upon the nature of the fluids being extracted. For the purposes of this disclosure, the particular problems addressed are those which occur when the fluids in the well contain particulate matter such as sand. This particulate matter, especially if it is sand, tends to abrade the working surfaces, such as pump plungers and valves, with which the particulate matter comes into contact. Another problem caused by particulates, such as iron sulfides or other fine grain materials, occurs when such particulates adhere to the moving parts of a pump causing those parts to stick and if unchecked, to eventually bind or tie up completely. As a result, the working lifetimes of fluid production pumps are often significantly shortened by the abrasive and/or adhesive actions of the particulate bearing fluids being pumped thereby.

Various sand or other particulate straining or filtering devices are commercially available, however, many of these suffer drawbacks. The most important drawbacks are those which affect the quantity of fluid being produced. For example, various straining or filtering devices, by their nature significantly reduce the speed of fluid movement and hence, reduce the quantity of fluid being produced. Another example involves the significant downtimes which occur while well production tubing or rod strings are pulled for cleaning or replacing the attached strainer or filter. The pulling of conventional strainers or filters is required in order to remove clogging particulates from such devices or to replace the device because many of such strainers or filters are simply not reusable once clogged.

A few prior attempts to solve some of these problems are described in my prior patent, U.S. Pat. No. 5,295,537. However, these are also somewhat disadvantageous due, in part, to their complexity and restrictive attachability solely to the production tubing. Therefore, there remains a need to provide an improved particulate separator for fluid production wells which will maintain, if not increase the fluid production of a well while also reducing the downtime required to pull and replace damaged pumps or to clean or replace clogged straining or filtering devices.

BRIEF SUMMARY OF THE INVENTION

The present invention is an improved particulate separator for use in separating sand and/or other particulates from fluids being extracted from a well or other fluid supply source. In particular, when used in an oil well, the present invention is specifically adapted to be attachable to the bottom end of a standard downhole oil well pump or a gas anchor attached thereto. Thus, this separator is thereby secured to the end of a conventional oil well sucker rod string (to which the downhole pump is connected) and is readily removable from the well with the sucker rod string when desired. This arrangement allows for the present invention to be removed separately from the fluid production tubing.

The basic structure of the particulate separator embodying the present invention involves a hollow, tubular strainer mandrel disposed concentrically within a hollow velocity tube. A small radial distance is left open between the interior of the velocity tube and the exterior of the strainer mandrel to create an annular, vertical fluid flow region. The velocity tube and the strainer mandrel are attached to each other at their respective top ends by a solid connection/plug means that prohibits fluid flow into or out of the top end of the annular fluid flow region. The bottom end of the annular flow region remains open to create the main fluid flow inlet to the particulate separator.

The strainer mandrel is, in the preferred embodiment, a helical tension spring with small or no appreciable clearances between adjacent coils. The strainer mandrel is plugged at its bottom end and is used to screen out floating solids that enter the separator. These solids are stopped by the mandrel while fluids are passed through to the strainer mandrel hollow interior for production flow upward to the downhole pump. A spring strainer mandrel has the advantage of allowing variation of its permeability by incremental extension of the length of the spring.

The preferred embodiment also includes a circular disk or an annular ring attached to the exterior bottom end of the strainer mandrel to maximize the acceleration of the fluid at the inlet to the particulate separator. This, the disk (or ring) does by narrowing the main inlet flow area. Thus, the fluid, after flowing down through the flow region existing outside of the particulate separator, experiences a dramatic velocity increase when sucked upward, in U-turn fashion, through the main inlet into the annular fluid flow region between the strainer mandrel and the velocity tube. The narrowness of the inlet area is a principal factor which governs the magnitude of this velocity change and thus, the addition of the circular disk or annular ring to further narrow this inlet area enlarges this differential. As the fluid accelerates or increases speed around the U-turn, particulates are propelled downwardly and outwardly relative to the fluid flow and are thus separated from the moving fluid. These particulates then accumulate in the bottom of the tubing mud anchor. The clean fluid is then produced in the conventional fashion by being pumped up and through the downhole pump and into the production tubing through which it flows to surface processing and storage facilities.

Accordingly, the primary object of the present invention is to provide an improved particulate separating device for fluid production wells having a strainer mandrel disposed within and attached to a velocity tube.

Another object of the present invention is to provide a means for reducing the inlet area of an improved particulate separator to accelerate the fluid flow as it enters the particulate separator.

Yet another object is to provide a strainer mandrel for an improved particulate separator that allows for a simply variable permeability.

Still another object is to provide a method for cleaning the strainer mandrel using a plurality of small perforations in the velocity tube of an improved particulate separator that produce jet streams.

These and still further objects as shall hereinafter appear are readily fulfilled by the present invention in a remarkably unexpected manner as will be readily discerned from the following detailed description of an exemplary embodiment thereof especially when read in conjunction with the accompanying drawing in which like parts bear like numerals throughout the several views.

DESCRIPTION OF THE PREFERRED EMBODIMENT

Figure 1:
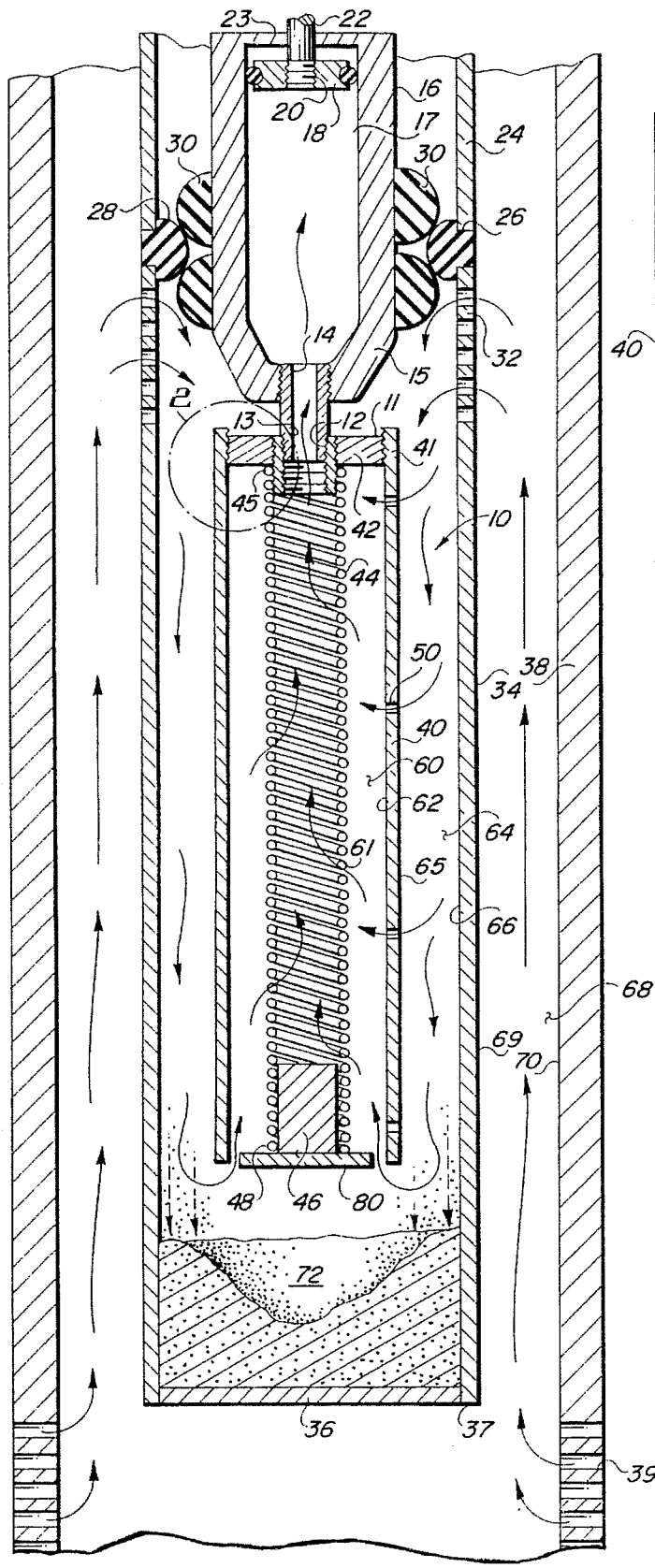
FIG. 1 is a cross-sectional view of the present invention as operatively disposed in a conventional oil well production tubing assembly which, in turn, is disposed in a cemented well casing.

The particulate separator embodying the present invention is shown in the attached figures and referred to generally using the reference numeral 10. Separator 10 is useful in any fluid producing well or other fluid supply source and is preferably adaptable to be attached to conventional oil well equipment as will be discussed in greater detail below. Again, this specification describes the use of the present invention in an oil well with no intention to so limit the scope of the invention.

As shown in FIG. 1, the first or upper end 11 of separator 10 is attached by suitable connection means 12 to the bottom end 13 of a conventional gas anchor 14. Gas anchor 14 is connected in a well-known manner to the bottom end 15 of a conventional pump barrel 16. Pump barrel 16 houses a standard downhole pump 17, the entire working elements of which are not completely shown in FIG. 1. All of the conventional components and connection means involved herein, including suitable connection means 12, preferably use or are adapted to connect with American Petroleum Institute (API) standard couplings whether threaded or otherwise. Thus, as is shown in the preferred embodiment, API standard threads on the exterior surface of bottom end 13 of gas anchor 14 mate with corresponding interior threads inside upper end 11 of separator Similarly, it may become desirable to couple separator 10 directly to pump barrel 16 without the specific use of a gas anchor 14 and thus, any of a number of conventional API couplings may be used to accomplish this alternative connection. Therefore, separator 10 is readily usable with a large assortment of existing well production equipment.

Pump 17 is of a conventional downhole type which includes conventional componentry such as inlet and outlet valves (neither shown), which may be of standing, traveling and/or other conventional types. A pump plunger 18 is shown as attached through conventional sucker rod coupling means 20 to the end of sucker rod assembly 22 which operably runs through pump top end 23 as is known in the art. Note, the structural elements as shown in FIG. 1 are not exact reproductions nor are they drawn to scale. Rather, these elements are shown fairly conceptually to simplify the description. This is true particularly with regard to the sizes and lengths of most elements because most of these are preferably much longer in practice as will be discussed in more detail below.

FIG. 1 further shows the conventional means by which pump barrel 16 is removably secured in fixed relative position within standard production tubing 24. This securing means includes a seating nipple 26 comprising one or more ridges 28. Ridges 28 are frictionally disposed in operable contact with one or more seating cups 30 which are attached in conventional fashion to the exterior surface of pump barrel 16, or a standard extension thereof. Seating cups 30 are made of rubber, leather or plastic to provide a flow tight engagement with seating nipple 26. In this way, pump barrel 16 and particulate separator 10 are maintained in stationary position within tubing 24 even during the operative reciprocation of the rod assembly 22 to which they are connected. As is understood in the art, the connection interface between seating nipple 26 and seating cups 30 is located below the outlet valves (not shown) of pump 17 so that pump 17 may properly fill production tubing 24 with clean fluid without any backflow downward into the lower tubing components described below.

The lower conventional tubing components shown in FIG. 1 include a perforated nipple 32 which is attached to and below seating nipple 26 and a lower tubing mud anchor 34 connected to and below perforated nipple 32. A bull plug 36 is fixed in the bottom end 37 of mud anchor 34. The overall arrangement of tubing components is removably positioned in a conventional cemented well casing 38 as is well known to those in the art. Standard perforations 39 are provided in casing 38 for initiating fluid flow into the above-described well production apparatus.

The preferred embodiment of particulate separator 10 involves a few unique components. Specifically, as shown in FIG. 1, separator 10 has a velocity tube 40, which at its upper end 41, is attached via connection/plug means 42 to a strainer mandrel 44 at its corresponding first or upper end 45. Mandrel 44 is sealed with a stopper plug 46 disposed within the interior of second or bottom end 48 of mandrel 44. A plurality of small, optional perforations or apertures 50 may be formed in velocity tube 40 at interspersed positions about and along the length of tube 40 to provide a secondary fluid flow inlet means for cleaning strainer mandrel 44. Apertures 50 create jet streams of fluid that spray against and thereby clean mandrel 44.

Figure 2:
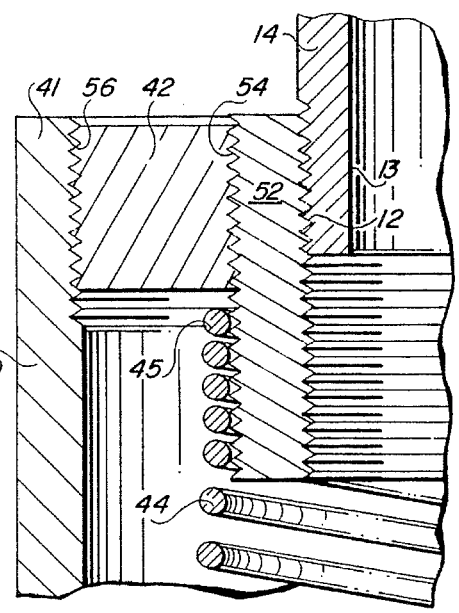
FIG. 2 is an enlarged view of the area designated as circled area 2 in FIG. 1.

As shown more particularly in FIG. 2, the preferred connection means 12 which connects particulate separator 10 to gas anchor 14 involves a threaded connection 12 which connects the bottom end 13 of gas anchor 14 to a threaded connection member 52. Connection member 52 is also connected inside upper end 45 of strainer mandrel 44. Connection/plug means 42 also makes use of threaded connections at its interior 54 and exterior 56 as shown most clearly in FIG. 2. As shown, threaded connection member 52 is preferably used to make the actual threaded connection of strainer mandrel 44 to connection/plug means 42 at connection 54 while the upper end 41 of velocity tube 40 is threaded to directly attach to connection/plug means 42 at connection 56.

Separator 10 is generally made from any of a plurality of sturdy materials machine manufactured as is well understood in the art. Strainer mandrel 44 is preferably made from a metal tension spring having either very small or no natural appreciable clearances between adjacent coils. Stopper plug 46 can be made from a sturdy metal or other material (such as cork) which is threaded to screw into or is otherwise fixed in or on bottom end 48 of strainer mandrel 44.

Velocity tube 40 is a unitary hollow cylinder that is preferably made from a predetermined length of sturdy metal or other strong material pipe or tube. The preferred pipe or tube has no more than 1¾ inches outside diameter (O.D.) for use of the present invention in API standard production tubing having 2 inches inside diameter (I.D.). This sizing allows for insertion clearance of velocity tube 40 through an API standard seating nipple 26 which, in a 2 inch I.D. production tubing assembly, presents a minimum 1²⁵⁄₃₂ inch I.D. Of course, other sizes could be made to more directly correspond to other tubing diameters such as other API standard (e.g. 2½ inch I.D.) tubing or other non-API standard tubing.

As mentioned above, the lengths depicted in the attached drawings are not to scale. The reason for this is that the actual working lengths are tremendous in comparison with the widths. For example, a tubing mud anchor 34 is typically 30 to 60 feet long which is inadequately shown here in relation to the typical, API standard 2 or 2½ inch I.D. mud anchor 34 shown in FIG. 1. Typical prior art filter elements are thus often intended to be 6, 12, 24 or even many more feet long. Gas anchors are also intended to be long, 12 feet being typical. However, the preferred length of separator 10 is preferably only 4 or 6 feet long when presenting a 1¾ inch O.D. Thus, depending on the length of the gas anchor used (if one is used), the present invention can be simply located at nearly any depth below perforated nipple 32 within mud anchor 34.

The making of a velocity tube 40, formed to the preferred dimensions (for example, 4 or 6 feet long and 1¾ inch O.D.) involves, next, threading the inside portion of its upper end 41 so that it will mate with connection/plug means 42 as generally described above. A plurality of optional small apertures 50 may also be drilled or otherwise formed in the solid wall of velocity tube 40. Connection/plug means 42 and connection member 52 are then similarly preferably formed from sturdy metals and threaded as shown in FIG. 2.

To assemble particulate separator 10, connection/plug means 42 is first connected to connection member 52 which is then screwed into the interior of upper end 45 of strainer mandrel 44. Strainer mandrel 44 is then inserted in velocity tube 40 so that connection/plug means 42 can be secured within upper end 41 of velocity tube 40. Note, other connection means (not shown) such as the use of welding may be incorporated in addition to or in lieu of the threaded connections shown and described herein.

The preferred width of strainer mandrel 44 is such that the open space or annular fluid flow region 60 left open between exterior surface 61 of mandrel 44 and interior surface 62 of velocity tube 40 is narrower than the space or annular fluid flow region 64 existing between exterior surface 65 of velocity tube 40 and interior surface 66 of tubing mud anchor 34. Thus, for the preferred embodiment using a 2 inch I.D. production tubing mud anchor 34 and a corresponding 1¾ inch O.D. velocity tube 40, the relative distance between strainer mandrel 44 and velocity tube 40 should be approximately ⅛ of an inch radially. Note, it is similarly desirable for the space or fluid flow region 68 existing between exterior surface 69 of tubing mud anchor 34 and interior surface 70 of casing 38 to be wider than either fluid flow region 60 or 64. Thus, the fluid being produced experiences its greatest velocity when traveling through annular fluid flow region 60.

When the separator 10 components are properly assembled, particulate separator be is then connected, via connection member 52 to bottom end 13 of a gas anchor 14. Gas anchor 14 is then attached to pump 17 which is, in turn, connected to the end of sucker rod assembly 22. Particulate separator be is thus ready for use. Preferably, gas anchor 14, pump 17, rods 22, tubing 24, seating nipple 26, perforated nipple 32, lower tubing mud anchor 34, bull plug 36 and all associated parts are all preferably API standard and thus, the manufacture and assembly of such are well known in the art.

The general working principles involved in the present invention include the coaction of gravitational forces with a sharp increase of the velocity of a particulate bearing fluid around a downward to upward U-turn that causes the sand and/or other relatively heavy particulates to separate from the moving fluid. This fluid then enters separator be and passes through strainer mandrel 44 to remove any of the relatively few remaining particulates, such as floating particulates. Finally, this clean fluid is sucked upward through downhole pump 17 to be produced through pump 17 and tubing 24 in conventional fashion.

In more detail, the operation of this device is described as follows. Separator 10 (as attached to sucker rod assembly 22) is first inserted into standard production well tubing 24 and is moved downward through seating nipple 26 and into operating position below perforated nipple 32. As mentioned above, pump 17, gas anchor 14 and particulate separator 10 are, at this point, removably fixed in stationary operating position by the frictional coaction of seating cups 30 with seating nipple 26.

The sucker rod assembly 22 is then reciprocated in standard fashion to reciprocate pump plunger 18 to move fluid produced from separator 10 via pump 17 into and up production tubing 24 to surface storage and processing facilities. The details of the fluid movement through separator 10 are shown in FIG. 1. As shown by the flow arrows in FIG. 1, fluid to be produced flows first into casing 38 through perforations 39 from its naturally occurring underground zone. From there, the fluid is sucked upward through space 68 into tubing mud anchor 34 via the perforations in perforated nipple 32. The fluid then flows downward through space 64 outside particulate separator 10. While flowing through space 64, the fluid has an appreciable intermediate velocity which is preferably greater than its initial velocity outside tubing mud anchor 34. Then however, when the fluid reaches the bottom of separator 10, it is sucked upward into separator 10 and is accelerated to a greater velocity due to the narrower flow region 60 presented by particulate separator 10. This acceleration, in coaction with gravitational forces, causes a separation of particulates downward and away from the moving fluid. The sand and other particulates continue their relative downward flow and accumulate on bull plug 36 in a particulate pile 72.

The separated fluid then flows through the small spaces between the adjacent coils of strainer mandrel 44. This action further separates any remaining particulates, particularly floating particulates, from the fluid stream. The fluid continues upward through gas anchor 14, pump barrel 16 and into and through pump 17. From this point, fluid production continues in a well known fashion being forced up to the surface by pump 17 via production tubing 24.

Operation generally proceeds until particulate pile 72 becomes large enough to block fluid flow into separator 10. When this occurs, rod string 22, with attached pump 16 and separator 10, may be pulled from the well to, for example, substitute a shorter gas anchor 14 or otherwise change the relative depth that separator 10 would have in mud anchor 34. Separator 10 could then be reinserted for further production. Note, the entire production tubing assemblage could also be pulled in order to empty the accumulated particulate pile 72 from mud anchor 34. However, the removal of rod string 22 with its attachments is often desirable over pulling the tubing because pulling the rod string is quicker and less difficult and thus results in less downtime. Pulling rod string 22 requires jerking rod string 22 upward with enough force such that plunger 18 pops top end 23 upward and thereby forces disengagement of seating cups 30 with seating nipple 26. Rod string assembly 22 with attached particulate separator 10 can then be removed from the well.

During operation, the optional few, small perforations or apertures 50 are used ideally to create a plurality of small jet streams of fluid into velocity tube 40. Often, the fluid in the well is at or near zero velocity during the downstroke half of the pump reciprocation cycle. When on the upstroke, however, these high velocity jet streams are useful to clean the strainer mandrel of particulate matter.

Figure 3:
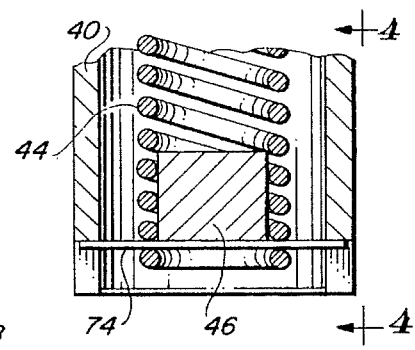
FIG. 3 is an enlarged view of an alternative embodiment of the lower end of a particulate separator of the present invention.
Figure 4:
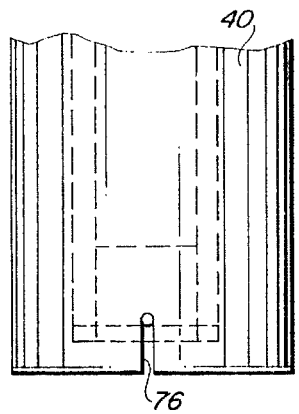
FIG. 4 is an elevational view of the embodiment of FIG. 3 taken on line 4—4 thereof.

An alternative embodiment of strainer mandrel 44 involves the use of a rod 74 inserted through bottom end 48 of the preferred tension spring mandrel 44 as shown in FIG. 3. Note, rod 74 may be, but is not necessarily inserted through stopper plug 46. Rod 74 is shorter than or has substantially the same length as the outside diameter of velocity tube 40 and thus may be used to hold spring mandrel 44 an extended preselected length. This it does by fitting in pre-cut adjustment notches 76 in velocity tube 40 as shown in FIG. 4. This creates a slightly larger permeability for spring mandrel 44 as may be desired in certain cases depending on the types of particulates in the fluid to be produced. Of course, adjustment notches of different lengths, or other, variously spaced adjustment holes or apertures may be used in velocity tube 40 to create a plurality of optional extension lengths to choose from for a given spring mandrel 44 and thereby provide a plurality of permeabilities to be used as desired.

Another version of rod 74 that is not shown involves an alternately extendible and retractable rod that is activatable by a commercially available differential gearing unit forced by a common allen wrench (or by similar means). The advantage of this type of rod is its simple adjustability such that the rod ends can easily be maneuvered into any diametrically opposed pair of adjustment apertures located in velocity tube 40.

In still another embodiment, a circular disk 80 is attached to bottom end 48 of strainer mandrel 44. Disk 80 is used to minimize the inlet area into fluid flow region 60 and thereby more greatly accelerate the fluid flow therethrough. This greater acceleration maximizes the velocity increase of the fluid when it changes direction (downward to upward U-turn) to enter the bottom end of particulate separator 10. The particulates, then, are more efficiently propelled downward, and separated away from the moving fluid stream.

Of course, the general principle of this alternative embodiment is the minimizing of the inlet area which can be accomplished by a number of different means. Other means include for example, the addition of an annular ring either to the interior of the bottom end of velocity tube 40 or to the exterior of bottom end 48 of mandrel 44. As with all of the components described in the several embodiments of the present invention, skilled artisans could forseeably make certain adjustments or substitutions for narrowing the inlet area and remain within the scope of this disclosure.

As discussed generally above, particulate separator 10 is useful for separating many kinds of particulates from many fluids other than merely sand from oil. Thus, the use of a particulate separator 10 for other purposes is intended to fall within the spirit of this disclosure.

From the foregoing, it is readily apparent that one or more new and useful embodiments of the present invention have been herein described and illustrated which fulfill all of the aforestated objects in a remarkably unexpected fashion. It is, of course, understood that such modifications, alterations and adaptations as may readily occur to the artisan confronted with this disclosure are intended within the spirit of this disclosure which is limited only by the scope of the claims appended hereto.

Accordingly, what is claimed is:

1. A particulate separator for use with fluid production equipment which includes a sucker rod assembly insertable in production tubing, said particulate separator comprising:

a hollow velocity tube having first and second ends;

a hollow strainer mandrel having first and second ends and having one or more gaps defined therethrough for allowing fluid to flow therethrough, said strainer mandrel being disposed within said velocity tube in spaced concentric relationship thereto to define an annular fluid flow region therebetween, the inlet to said annular fluid flow region being defined by the space between said second end of said velocity tube and said second end of said strainer mandrel, and said strainer mandrel having means for disallowing fluid flow into said second end of said strainer mandrel;

connection means for securing said first end of said strainer mandrel to and within said first end of said velocity tube, said connection means being solid for disallowing fluid flow therethrough; and attachment means for attaching said particulate separator to said sucker rod assembly for use in said production tubing.

2. A particulate separator according to claim 1 in which said strainer mandrel is a helical tension spring.

3. A particulate separator according to claim 2 in which said helical tension spring has no natural appreciable clearances between the adjacent coils thereof.

4. A particulate separator according to claim 3 which further comprises means for extending said helical tension spring a preselected distance to create preselected clearances between said adjacent coils.

5. A particulate separator according to claim 4 in which said means for extending said helical tension spring comprises a rod having first and second ends which is inserted transversely through said second end of said strainer mandrel; and receiving means formed in said velocity tube for containing said first and second ends of said rod.

6. A particulate separator according to claim 5 in which said receiving means are a plurality of small apertures.

7. A particulate separator according to claim 5 in which said receiving means are a plurality of slots.

8. A particulate separator according to claim 1 which further comprises means for reducing the area of said inlet to said annular flow region defined by said second end of said strainer mandrel and said second end of said velocity tube.

9. A particulate separator according to claim 8 in which said means for reducing the area of said inlet comprises a circular disk attached to said second end of said strainer mandrel.

10. A particulate separator according to claim 8 in which said means for reducing the area of said inlet comprises an annular ring affixed to the exterior surface of said second end of said strainer mandrel.

11. A particulate separator according to claim 8 in which said means for minimizing the area of said inlet comprises an annular ring affixed within the interior of said second end of said velocity tube.

12. A particulate separator according to claim 1 in which said velocity tube has a plurality of apertures formed therethrough.

13. A particulate separator for use with fluid production equipment comprising:

a hollow velocity tube having first and second ends;

a hollow strainer mandrel having first and second ends and having one or more gaps defined therethrough for allowing fluid to flow therethrough, said strainer mandrel being disposed within said velocity tube in spaced concentric relationship thereto to define an annular fluid flow region therebetween, the inlet to said annular fluid flow region being defined by the space between said second end of said velocity tube and said second end of said strainer mandrel, and said strainer mandrel being a helical tension spring and having means for disallowing fluid flow into said second end of said strainer mandrel;

connection means for securing said first end of said strainer mandrel to and within said first end of said velocity tube, said connection means being solid for disallowing fluid flow therethrough; and attachment means for attaching said particulate separator to fluid production equipment.

14. A particulate separator according to claim 13 in which said helical tension spring has no natural appreciable clearances between the adjacent coils thereof.

15. A particulate separator according to claim 14 which further comprises means for extending said helical tension spring a preselected distance to create preselected clearances between said adjacent coils.

16. A particulate separator according to claim 15 in which said means for extending said helical tension spring comprises a rod having first and second ends which is inserted transversely through said second end of said strainer mandrel; and receiving means formed in said velocity tube for containing said first and second ends of said rod.

17. A particulate separator according to claim 13 which further comprises means for reducing the area of said inlet to said annular flow region defined by said second end of said strainer mandrel and said second end of said velocity tube.

18. A particulate separator according to claim 13 in which said velocity tube has a plurality of apertures formed therethrough.

* * * * *